United States Patent Office 2,767,171
Patented Oct. 16, 1956

2,767,171
STARCH CARBONATE

Joseph W. Opie, Minneapolis, Minn., assignor to General Mills, Inc., a corporation of Delaware No Drawing. Application November 27, 1953,
Serial No. 394,891

5 Claims. (Cl. 260—233.3)

The present invention relates to starch carbonate. This material is nondispersible in water and does not gelatinize under the circumstances under which starch ordinarily gelatinizes.

The product is especially useful as a surgical dusting powder. Surgical dusting powders are used for dusting such things as surgeon's gloves and various prosthetic devices to make them easy to apply. Such dusting powders must of course be sterile and accordingly they must withstand sterilization with live steam. They likewise should be nontoxic and should be absorbable by body tissues. In the past talc has been used as a surgical dusting powder but is objectionable in that it is not absorbable and also tends to cause adhesions. More recently various starch products have been used for this purpose but have necessitated the use of non-caking agents such as magnesium oxide. Since the magnesium oxide is not absorbable by the body such dusting powders still leave something to be desired.

The present product is one which may be used without an anti-caking agent and which likewise possesses the requisite properties of a surgical dusting powder. It will withstand sterilization with live steam and is nontoxic and absorbable by the body. Accordingly, it is an improvement in the field of surgical dusting powder.

It is therefore an object of the present invention to provide a starch carbonate product which is insoluble in water and will not gelatinize under the ordinary circumstances under which starch gelatinizes. It is another object of the present invention to provide a starch carbonate which will resist sterilization with live steam and which is nontoxic and absorbable by body tissues.

It is a further object of the present invention to provide a process of producing the above product.

In preparing a surgical dusting powder it is preferred to start with a relatively pure starch starting material. This may be a corn starch, wheat starch, potato starch, arrowroot starch, cassava starch, or any of the usual starches of commerce. In addition to the preparation of starch carbonates from relatively pure starch starting materials it is also possible to produce a starch carbonate in admixture with other materials with which the starch is normally associated in nature. Thus such impure starch starting materials as wheat flour may be employed. The product thus obtained is insoluble in water and may be used in any application in which an insoluble starch is desirable. Since, however, in this instance the starch carbonate has associated with the wheat protein, such product is generally not regarded as suitable for a surgical dusting powder.

Starch carbonate may be prepared through an ester interchange reaction between starch and an alkylene carbonate. The following illustrates the reaction between starch and ethylene carbonate to form a diester with the starch chain and ethylene glycol:

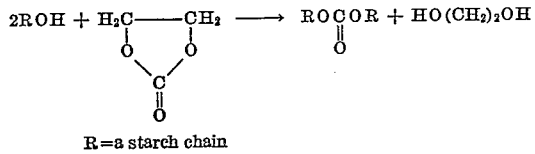

R = a starch chain

The reaction involves a simple admixture of the starch with the molten alkylene carbonate and the heating of the mixture under vacuum. It is preferred to employ as high a temperature as possible below the degradation point of the starch. Usually the boiling point of the alkylene carbonate is the practical upper limit, although pressure equipment may be used to permit higher temperatures. Generally temperatures in the approximate range of 100–150° C. are adequate. The starch carbonate is insoluble at the conclusion of the reaction mixture and may be filtered off and purified by washing with water or a lower aliphatic alcohol such as methanol.

There is considerable variation possible in the relative ratio of the alkylene carbonate to the starch used. Likewise the time and temperature of the reaction may be varied considerably depending upon the particular type of product desired. In general it is preferred to conduct a reaction such that at least 0.05 carbonate groups per glucose unit are introduced into the starch molecule. When sufficient carbonate groups have been introduced to give the starch the desired physical properties no particular advantage is obtained by increasing the degree of substitution further. Accordingly, for this particular purpose a degree of substitution within the approximate range of 0.05 to 0.2 is suitable. It is apparent, of course, that a higher degree of substitution may be obtained for products useful in other applications.

In place of the ethylene carbonate other alkylene carbonates such as propylene carbonate and the like may be used. Since the alkylene residue does not become part of the product, the particular alkylene carbonate used is not critical.

Example 1

Wheat starch (100 g.) and molten ethylene carbonate (210 g.) were mixed together in a 3-necked flask equipped with a short Vigreaux column, a vacuum distillation receiver, and a mechanical stirring device. The flask was placed under vacuum and heating was started. When the flask temperature reached 50° C. the evolution of some water was noted. After one hour the top temperature had reached 140° C. and was held at this point. A distillate (ethylene glycol) boiling at a 116° C./27 mm. was collected. The reaction was carried on until the temperature rose to a 140° C. when ethylene carbonate started to distil. At this point the heating was stopped. The reaction was then filtered while hot and the precipitate was washed twice with water and once with methanol. The precipitate weighed 95 g. after air-drying for 24 hours.

A portion of the above product was boiled with water under conditions normally causing gelation of starch. No gelation occurred and the product quickly settled from the water.

Another portion of the product was finely ground and placed in an open petri dish in a bacteriological autoclave and sterilized with live steam for 30 minutes. The material remained unchanged during this treatment.

Example 2

The procedure of Example 1 was repeated employing, however, an equivalent amount of propylene carbonate in place of the ethylene carbonate. The product obtained was identical in its properties.

Example 3

Wheat flour (100 g.) and ethylene carbonate (200 g.) were mixed. Heating and stirring were started while a pressure of 26 mm. was maintained on the system. A small amount of water vapor was collected at 35° C. during the first hour. The temperature of the reaction mixture was 137° at this point. At the end of the second hour the distilling temperature was 132° C. The reaction was stopped. The mixture was filtered while hot, and the product was washed with water, and then with methanol. It was air-dried for 24 hours. The yield of product was 83 g.

This product did not paste when boiled with water or when autoclaved under 15 lbs. of live steam for 30 minutes.

I claim as my invention:

1. Starch carbonate diester of unmodified starch.
2. A starch carbonate diester of unmodified starch having a degree of substitution of from 0.05 to 0.2 carbonate groups per glucose unit.
3. Process of producing starch carbonate diester which comprises reacting unmodified starch with an alkylene carbonate under sub-atmospheric pressure at temperatures above 100° C. but below the degradation temperature of the starch, and distilling off the alkylene glycol as it is formed.
4. Process of producing starch carbonate diester which comprises reacting unmodified starch with an ethylene carbonate under sub-atmospheric pressure at temperatures of 100–140° C., and distilling off the ethylene glycol as it is formed.
5. Process of producing starch carbonate diester which comprises reacting unmodified starch with propylene carbonate under sub-atmospheric pressure at temperatures of 100–140° C., and distilling off the propyene carbonate as it is formed.

References Cited in the file of this patent

UNITED STATES PATENTS

| | | |
|---|---|---|
| 2,448,767 | Carlson | Sept. 7, 1948 |
| 2,562,978 | Wolff | Aug. 7, 1951 |
| 2,668,169 | Wolff | Feb. 2, 1954 |